United States Patent Office 3,274,204
Patented Sept. 20, 1966

3,274,204
PREPARATION OF SULFATO-BETAINE-TYPE COMPOUNDS
Donald L. Klass, Barrington, and Vincent Brozowski, Mundelein, Ill., assignors, by mesne assignments, to The Union Oil Company of California, Los Angeles, Calif., a corporation of California
No Drawing. Filed Aug. 1, 1960, Ser. No. 46,362
12 Claims. (Cl. 260—294.8)

This invention relates to certain organic compounds having the structure of an inner salt or a zwitterion and to methods of preparation of said compounds.

One of the objects of this invention is the preparation of novel organic compounds having the structure of an inner salt or a zwitterion.

Another object of this invention is the preparation of novel organic compounds from organic epoxides, which compounds have the structure of an inner salt.

A feature of this invention is the provision of a novel class of organic inner salts of the formula:

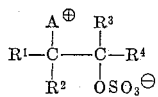

where $R^1$, $R^2$, $R^3$, and $R^4$ are selected from the group consisting of hydrogen and hydrocarbon (or substituted hydrocarbon) radicals, and $A^\oplus$ is a tertiary amine.

Another feature of this invention is the provision of an improved process for the preparation of organic inner salts by reaction of an organic epoxide with a sulfur-trioxide-tertiary-amine complex, or by sequential treatment of an epoxide with a sulfonating agent, such as dioxane-sulfur-trioxide complex, and then with a tertiary amine.

Another feature of this invention is the provision of an improved process for the preparation of organic inner salts by reaction of a tertiary amine with a cyclic sulfate ester.

Other objects and features of this invention will become apparent from time to time throughout the specification and claims as hereinafter related.

This invention is based upon our discovery of a novel class of organic compounds, viz., inner salts of the formula:

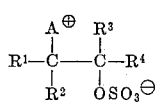

where $R^1$, $R^2$, $R^3$, and $R^4$ are selected from the group consisting of hydrogen and hydrocarbon radicals, and $A^\oplus$ is a tertiary amine. This invention is further based upon our discovery that the novel compounds of this invention can be prepared by reaction of an organic epoxide with a sulfur-trioxide-tertiary-amine complex, by reaction of a cyclic sulfate ester with a tertiary amine, or by sequential treatment of an epoxide with a sulfonating agent, such as dioxane-sulfur-trioxide complex, followed by treatment with a tertiary amine.

In carrying out our invention, an organic epoxide, e.g., epichlorohydrin, ethylene oxide, propylene oxide, dodecene oxide, hexacontene oxide, styryl oxide, cyclohexene oxide, butadiene diepoxide, etc., is reacted with a sulfur-trioxide-tertiary-amine complex to produce an amine sulfate having the structure of a zwitterion, or inner salt. The foregoing epoxides and those disclosed in the subsequent examples and in Table I are all oxiranes containing from 2 to 60 carbon atoms. The amine complexes which may be used in carrying out this reaction include complexes of sulfur trioxide with any and all tertiary amines, e.g., trihydrocarbyl-substituted amines, such as trimethylamine, triethylamine, triphenylamine, dimethylaniline, etc.; and heterocyclic tertiary amines, such as pyridine, quinoline, acridine, etc. These tertiary-amine-sulfur-trioxide complexes are reacted with organic epoxides by mixing and heating, when necessary, to effect reaction. Where the reactancts are immiscible, or are solids, an inert solvent, e.g., toluene, hexane, cleaning naphthas, ethylene dichloride, etc., may be used to dissolve the reactants and facilitate completion of reaction. When a mutual solvent is used in carrying out the reaction, the reactants are dissolved or slurried in the solvent and the reaction allowed to proceed at any suitable temperature in the range from room temperature, or below, up to the reflux temperature of the solution. In most cases, it is desirable to reflux the solution to insure completion of reaction within a reasonably short period of time.

The compounds which are produced in accordance with this invention are soluble in water and in a variety of organic solvents. Some of these compounds have surfactant properties and may be substituted in applications where reduction of surface tension of water or an organic liquid is desired. The compounds which have a long aliphatic chain attached to the central portion of the molecule have detergent properties as well as surfactant properties, and may be utilized as detergents in the manner well known to those skilled in the art. These compounds are also useful in aqueous solution as insecticides to kill parasitic insects. The compounds of this invention also have chemical structures similar to compounds of known physiological activity, and are thus potentially useful as intermediates in the preparation of physiologically active compounds.

EXAMPLE I

A 31.8-g. (0.2 mol) portion of pyridine-sulfur-trioxide complex was slurried in 25 ml. of ethylene dichloride and mixed with 20.0 g. (0.216 mol) of epichlorohydrin in 25 ml. of ethylene dichloride. The resulting mixture was stirred at room temperature for 15 minutes and then heated at reflux temperature for 2 hours. The resulting reaction mixture was then filtered and a solid white product was recovered. The product was washed with ethylene dichloride and air-dried. The product thus obtained weighed 29.2 g. and melted (with decomposition) at 265° C. A small portion of the product was recrystallized from water to obtain a sample for analysis. This purified sample melted (with decomposition) at 268° C.

The product was analyzed for the proportions of the various elements therein and comparison of the theoretical and determined elemental analyses is as follows:

FOR $C_8H_{10}O_4SClN$

|  | Theoretical, Percent wt. | Determined, Percent wt. |
|---|---|---|
| Carbon | 38.2 | 37.7 |
| Hydrogen | 4.01 | 4.3 |
| Sulfur | 12.74 | 12.6 |
| Nitrogen | 5.57 | 4.9 |
| Chlorine | 14.1 | 14.8 |

From the experiments which we have carried out, it appears that the reaction occurred as follows:

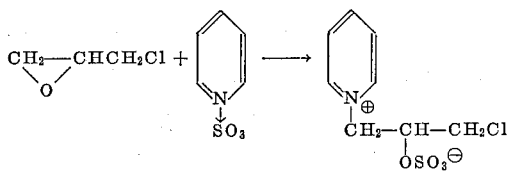

This structure has been evidenced by (1) the elemental analysis for carbon, hydrogen, nitrogen, sulfur, and chlorine; (2) the high melting point characteristic of an internal salt or zwitterion; (3) solubility in organic solvent; (4) the absence of a precipitate with silver nitrate solution, indicating that the chlorine atom remained in the same position as in the original epichlorohydrin; (5) the absence of a precipitate with barium chloride solution unless previously warmed with dilute hydrochloric acid, indicating the presence of a C—O—SO₃ linkage; (6) the neutrality of aqueous solutions.

In another experiment, the same procedure was followed except that 10.0 g. (0.108 mol) of epichlorohydrin was used as the reactant instead of the 20.0 g. used in the previous experiment. Under the same reaction conditions, there was obtained 25.5 g. of the same product.

EXAMPLE II

A 31.8-g. (0.2 mol) portion of pyridine-sulfur-trioxide complex was slurried in 50 ml. of ethylene dichloride and mixed with 12.5 g. (0.216 mol) of propylene oxide. The resulting reaction mixture was warmed to 80° C. and maintained at this temperature for 3 hours, with stirring. The mixture was then cooled to room temperature and filtered. The solid product which was obtained was washed consecutively with ethylene dichloride and ether, after which it was air-dried. The dried product weighed 23.9 g. and melted at 260° C. A small portion was recrystallized from water to obtain a sample for analysis. The theoretical and determined analyses were as follows:

FOR $C_8H_{11}O_4SN$

|  | Theoretical, Percent wt. | Determined, Percent wt. |
|---|---|---|
| Carbon | 44.2 | 44.5 |
| Hydrogen | 5.1 | 5.3 |
| Sulfur | 14.8 | 14.8 |

From the experiments which we have carried out, it appears that the reaction which took place was as follows:

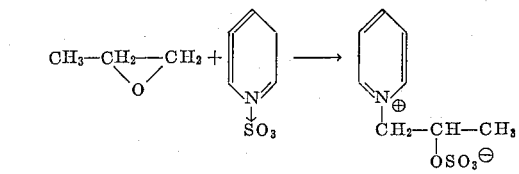

EXAMPLE III

Two additional experiments were carried out in which dodecene-1-oxide and styryl oxide, respectively, were substituted for propylene oxide in the process described in Example II. With dodecene-1-oxide (heated in ethylene dichloride) and pyridine-sulfur-trioxide, the following reaction took place:

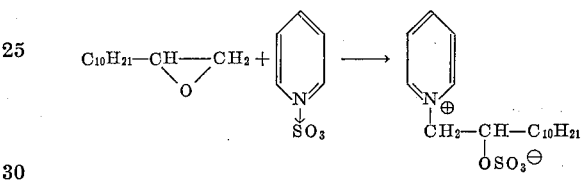

The product obtained was a white solid having an elemental analysis corresponding to the product indicated in the equation and melting with decomposition at 260° C.

When styryl oxide and pyridine-sulfur-trioxide were heated in ethylene dichloride, a white solid product was obtained having a melting point of 205°–215° C. The reaction which took place was as follows:

$$\phi CH\!-\!-\!CH_2 + \underset{SO_3}{\underset{\downarrow}{\overset{}{\bigcirc\!\!\!\!N}}} \longrightarrow \underset{\underset{OSO_3^{\ominus}}{\overset{}{CH_2\!-\!CH\!-\!\phi}}}{\overset{}{\overset{\oplus}{\bigcirc\!\!\!\!N}}}$$

EXAMPLE IV

When ethylene oxide and the pyridine-SO₃ complex were heated in n-hexane, a high-melting-point solid was obtained as in the previous examples, melting at 194°–201° C. after recrystallization from dimethylformamide. This product had the formula:

$$\underset{\underset{OSO_3^{\ominus}}{\overset{}{CH_2\!-\!CH_2}}}{\overset{\oplus}{\bigcirc\!\!\!\!N}}$$

EXAMPLE V

When other tertiary amine complexes and hydrocarbon epoxides are reacted, solid products are obtained as indicated in Table I.

Table I

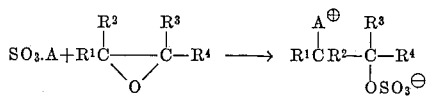

| A | Epoxide | Solvent | Product |
|---|---------|---------|---------|
| N(CH₃)₃ | CH₃CH—CH—CH₃ (epoxide) | Ethylene Dichloride | CH₃CH(N(CH₃)₃⁺)—CH—CH₃, OSO₃⁻ |
| φN(CH₃)₂ | CH₃(CH₂)₁₅CH—CH₂ (epoxide) | do | φN(CH₃)₂⁺, CH₂—CH—(CH₂)₁₅CH₃, OSO₃⁻ |
| (quinoline) | cyclohexene oxide | n-Heptane | (quinolinium-cyclohexyl-sulfato product) |
| (pyridine) | CH₂—CH—CH—CH₂ (diepoxide) | n-Hexane | (bis-pyridinium disulfato product) |

EXAMPLE VI

Dioxane, 210 ml., in 100 ml. of ethylene dichloride was treated with 80 g. of sulfur trioxide, with stirring and cooling at 0 to 10° C., to produce a dioxane-sulfur-trioxide complex. Ethylene oxide, 100 g., was then added to the resulting slurry with stirring and cooling over a period of two hours. A 50-ml. portion of this solution was then treated with 5 ml. of pyridine. A white semi-solid product separated and was recovered by filtration. The product was recrystallized twice from dimethyl formamide to yield small white crystals, M.P. 194°–201° C. This product was an inner salt, 1-pyridinium-2-sulfato-ethane. This product gave no precipitate with barium chloride unless previously warmed with dilute hydrochloric acid. When this product was treated with aqueous base, it yielded a clear light yellow solution. Evaporation in vacuo of another 50-ml. aliquot gave a light yellow oil as residue. Sublimation of this oil yielded a small amount of white needles, identified as cyclic ethylene sulfate, crude M.P. 91°–93° C. From these results it was concluded that cyclic ethylene sulfate is an intermediate in the formation of 1-pyridinium-2-sulfato-ethane by the reaction of ethylene oxide with sulfur trioxide-dioxane in Example IV.

When propylene oxide was treated sequentially with sulfur-trioxide-dioxane and pyridine in the manner described above, there was obtained a white crystalline product identical with the product of Example II.

EXAMPLE VII

We have also found that the novel inner salt or zwitterion-type of compounds of this invention can be prepared by reaction of a tertiary amine with a cyclic sulfate ester. The sulfate esters which react in this manner are generally prepared by reaction of sulfur trioxide with an epoxide and have the general formula:

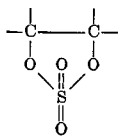

where the valences of the carbon atoms are connected to hydrogen or hydrocarbon radicals (or substituted hydrocarbon radicals), including aromatic and cyclic radicals. Cyclic sulfates of this type include ethylene sulfate, propylene sulfate, butylene sulfate, dodecene sulfate, octadecene sulfate, styrene sulfate, cyclohexene sulfate, etc., and react with any tertiary amine to produce the novel amine sulfate salts of this invention. In reacting a tertiary amine with a cyclic organic sulfate, the reactants are mixed, either alone or together with a mutual solvent if needed, to insure intimacy of contact to facilitate reaction.

EXAMPLE VIII

A 12.4-g. portion (0.1 mol) of ethylene sulfate is mixed with 7.9 g. of pyridine (0.1 mol) and 100 ml. of ethylene dichloride and refluxed for 60 minutes. From this reaction, there is obtained a white solid having the same composition as the product produced by reaction of the pyridine-sulfur-trioxide complex with ethylene oxide.

EXAMPLE IX

A 26.4-g. portion (0.1 mol) of dodecene sulfate is mixed with 5.9 g. (0.1 mol) of trimethylamine in 100 ml. of ethylene dichloride, and heated at 80° C. for 60 minutes. From this reaction, there is recovered a white high-melting-point solid having a composition corresponding to the reaction product of trimethylamine-sulfur-trioxide complex with dodecene oxide.

EXAMPLE X

A 20.0-g. portion of styrene sulfate is reacted with 12.1 g. of dimethylaniline in trichloroethane at 50°–60° C. From this reaction, there is obtained a white, high-melting solid which corresponds to the product obtained by reaction of dimethylaniline-sulfur-trioxide complex with styryl oxide.

While we have described this invention with special emphasis upon several preferred embodiments, particularly the reaction of pyridine and trimethylamine complexes of sulfur trioxide with alkylene oxides, it should be understood that this process is generally operative for effecting the reaction of any sulfur-trioxide-tertiary-amine complex with any organic epoxide. Where the reactants are liquid, or where one is soluble in the other, no solvent is required. Where the reactants are immiscible, or are both solids, any inert solvent may be used to carry out the reaction. Lower saturated hydrocarbons and chlorinated hydrocarbons are preferred reaction media for this process, since these solvents are inert toward both reactants. In preparing the novel compounds of this process by the alternate reaction of a cyclic sulfate ester with a tertiary amine or the sequential reaction of an epoxide with a sulfonating agent and a tertiary amine, any compound within the defined class may be used. Thus, any unsubstituted or substituted cyclic sulfate ester may be reacted with any tertiary amine, so long the the cyclic ester does not contain substituents which would be reactive toward the amine. As in the first-described process, this reaction may be carried out in solution in any inert solvent for the reactants.

The embodiments of the invention in which an exclusive property or privilege is claimed are defined as follows.

We claim:

1. A method of preparing inner salts comprising reacting an oxirane containing 2–60 carbon atoms with sulfur trioxide to form a cyclic sulfate ester of the formula

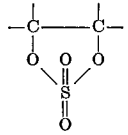

in which the unsatisfied valences of the carbon atoms are connected to a material selected from the group consisting of hydrogen and hydrocarbon radicals, and reacting the resulting ester with a tertiary amine.

2. A method in accordance with claim 1 in which the ester is ethylene sulfate and in which the tertiary amine is pyridine.

3. A method in accordance with claim 1 in which the ester is dodecene sulfate and the tertiary amine is trimethylamine.

4. A method in accordance with claim 1 in which the ester is styrene sulfate and the tertiary amine is dimethylaniline.

5. A method of preparing inner salts which comprises reacting a tertiary amine-sulfur trioxide complex of a tertiary amine containing only hydrocarbon groups connected to the nitrogen atom with an oxirane containing from 2 to 60 carbon atoms in the molecule.

6. A method according to claim 5 in which the reaction is carried out with the reactants in an inert solvent.

7. A method in accordance with claim 6 in which the reaction is carried out at a temperature between room temperature and the reflux temperature of the solution.

8. A method in accordance with claim 5 in which the tertiary amine is pyridine and the oxirane is ethylene oxide.

9. A method in accordance with claim 5 in which the tertiary amine is pyridine and the oxirane is propylene oxide.

10. A method in accordance with claim 5 in which the tertiary amine is pyridine and the oxirane is dodecene oxide.

11. A method in accordance with claim 5 in which the tertiary amine is pyridine and the oxirane is styryl oxide.

12. A method of preparing inner salts comprising reacting an oxirane containing 2 to 60 carbon atoms with dioxane-sulfur trioxide complex and then with a tertiary amine.

References Cited by the Examiner

UNITED STATES PATENTS

| 1,483,084 | 2/1924 | Green et al. | 260—458 |
| 2,697,657 | 12/1954 | Stayner et al. | 260—458 |
| 2,699,991 | 1/1955 | Stayner et al. | 260—458 |

FOREIGN PATENTS

| 1,028,718 | 4/1958 | Germany. |
| 1,149,769 | 7/1957 | France. |

OTHER REFERENCES

Lichtenberger: "Bull. Soc. Chim. France" (1948), pp. 1002–1012.

King et al.: J.A.C.S., vol. 71, pp. 3498–3500 (1949).

Whitmore: "Organic Chemistry," 2d ed., p. 311 (Van Nostrand) (1951).

WALTER A. MODANCE, *Primary Examiner.*

IRVING MARCUS, *Examiner.*

R. T. BOND, *Assistant Examiner.*